US008471964B2

(12) United States Patent
Kimura

(10) Patent No.: US 8,471,964 B2
(45) Date of Patent: Jun. 25, 2013

(54) DEVICE, METHOD AND MEDIUM FOR CONVERSION OF CONTROL SIGNAL OUTPUT BY INCOMPATIBLE REMOTE CONTROL

(75) Inventor: Masatoshi Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 248 days.

(21) Appl. No.: 12/768,942

(22) Filed: Apr. 28, 2010

(65) Prior Publication Data

US 2010/0208147 A1 Aug. 19, 2010

Related U.S. Application Data

(63) Continuation of application No. PCT/JP2007/071230, filed on Oct. 31, 2007.

(51) Int. Cl.
*H04N 5/44* (2006.01)
*G08C 19/16* (2006.01)
*H04L 17/02* (2006.01)

(52) U.S. Cl.
USPC .......................... 348/734; 341/176; 340/12.29

(58) Field of Classification Search
USPC .......... 348/706, 734, 569, 553, 552; 341/176; 340/12.22, 12.24, 12.28, 12.29, 12.52, 12.53, 340/13.21, 13.25
See application file for complete search history.

(56) References Cited

U.S. PATENT DOCUMENTS 5,519,457 A * 5/1996 Nishigaki et al. ............ 348/734
5,715,020 A * 2/1998 Kuroiwa et al. .............. 348/734
6,107,951 A * 8/2000 Katayama et al. ............ 341/176
6,822,602 B2 * 11/2004 Kang et al. .................... 341/173
2005/0078226 A1 * 4/2005 Matoba ......................... 348/734
2005/0219424 A1 * 10/2005 Ryu ............................. 348/734
2007/0008170 A1 * 1/2007 Funaki ..................... 340/825.72

FOREIGN PATENT DOCUMENTS

JP 2001-145179 5/2001
JP 2003-032508 1/2003
JP 2004-179970 6/2004
JP 2007-184824 7/2007

OTHER PUBLICATIONS

International Search Report, mailed Dec. 25, 2007, in corresponding International Application No. PCT/JP2007/071230 (1 pg.).
Chinese Office Action issued Jul. 17, 2012 in corresponding Chinese Patent Application No. 200780101321.9.

(Continued)

*Primary Examiner* — Victor Kostak
(74) *Attorney, Agent, or Firm* — Staas & Halsey LLP

(57) ABSTRACT

An electronic device (1) which is remote controllable has a conversion table storing unit (31) for holding a conversion table for converting an incompatible control signal that does not support the electronic device (1) into a compatible control signal that supports the electronic device (1), an input receiving unit (32) for receiving the input of the incompatible control signal based on the output of an incompatible remote control (4) that does not output the compatible control signal, a conversion unit (33) for converting the incompatible control signal the input of which has been received by the input receiving unit (32) into the compatible control signal according to the conversion table, and a control unit (34) for controlling the electronic device (1) according to the compatible control signal converted by the conversion unit (33).

8 Claims, 7 Drawing Sheets

OTHER PUBLICATIONS

Notice of Reason for Rejection dated Sep. 18, 2012 with its English translation issued in the corresponding Japanese application No. 2009-538885.

European Search Report dated Nov. 8, 2012 issued in European Patent Application No. 07830964.8.

Japanese Office Action issued on Mar. 19, 2013 in corresponding Japanese Patent Application No. 2009-538885.

* cited by examiner

FIG. 3

| PC REMOTE CONTROL | | COMPANY A REMOTE CONTROL | | COMPANY B REMOTE CONTROL | |
|---|---|---|---|---|---|
| CONTROL CONTENT | CONTROL SIGNAL | CONTROL CONTENT | CONTROL SIGNAL | CONTROL CONTENT | CONTROL SIGNAL |
| ↑ | 0x2A | ↑ | 0x0A | ↑ | 0x0A |
| ↓ | 0x2B | ↓ | 0x0B | ↓ | 0x0B |
| ← | 0x2C | ← | 0x0C | ← | 0x0C |
| → | 0x2D | → | 0x0D | → | 0x0D |
| ENTER | 0x01 | ENTER | 0x0E | ENTER | 0x0E |
| BLUE | 0x02 | BLUE | 0x90 | BLUE | 0x90 |
| RED | 0x03 | RED | 0x91 | RED | 0x91 |
| GREEN | 0x04 | GREEN | 0x92 | GREEN | 0x92 |
| YELLOW | 0x05 | YELLOW | 0x93 | YELLOW | 0x93 |
| RETURN | 0x11 | RETURN | 0x01 | RETURN | 0x02 |
| CONVENIENT | 0x12 | CONVENIENT | 0x03 | CONVENIENT | 0x04 |
| PLAY | 0x13 | PLAY | -- | PLAY | 0x06 |
| ⋮ | ⋮ | ⋮ | ⋮ | ⋮ | ⋮ |

FIG. 4

| MANUFACTURER | MANUFACTURER CODE | REMARKS |
| --- | --- | --- |
| UNDEFINED | 0x00 | INVALID |
| COMPANY A | 0x01 | |
| COMPANY B | 0x02 | |

DEVICE, METHOD AND MEDIUM FOR CONVERSION OF CONTROL SIGNAL OUTPUT BY INCOMPATIBLE REMOTE CONTROL

This is a continuation of Application PCT/JP2007/071230, filed on Oct. 31, 2007, now pending, the contents of which are herein wholly incorporated by reference.

FIELD

The present application relates to an electronic device that can be operated by using a remote control.

BACKGROUND

Conventionally, as a technology for adapting a remote control to a plurality of devices, there is proposed a technology of causing a remote control to store in advance codes for adapting the remote control to a plurality of devices, connecting a device as a target of operation to this remote control to read out a device name, and setting the remote control to output a code corresponding to the read-out device name among the codes stored in advance (see Patent document 1).

There is also proposed a technology that enables a remote control to receive a signal from another remote control and learn a code of the another remote control based on a received content by providing means for receiving a signal from another remote control in the remote control (see Patent document 2).

[Patent document 1] JP 2007-184824 A

[Patent document 2] JP 2004-179970 A

SUMMARY

Specifically, according to the present invention, an electronic device that can be operated by a remote control includes: conversion table storing unit to store a conversion table for converting an incompatible control signal that does not support the electronic device into a compatible control signal that supports the electronic device; input receiving unit to receive an input of the incompatible control signal based on an output of an incompatible remote control that does not output the compatible control signal; conversion unit to convert the incompatible control signal, which is input to and received by the input receiving unit, into the compatible control signal according to the conversion table; and control unit to control the electronic device according to the compatible control signal obtained through the conversion performed by the conversion unit.

The object and advantage of the embodiment will be realized and attained by means of the elements and combinations particularly pointed out in the claims.

It is to be understood that both the foregoing general description and the following detailed description are exemplary and explanatory only and are not restrictive of the invention, as claimed.

BRIEF DESCRIPTION OF THE DRAWINGS

FIG. 3 is a diagram illustrating a structure of a conversion table in the embodiment;

FIG. 4 is a diagram illustrating contents of manufacturer codes in the embodiment;

DESCRIPTION OF EMBODIMENTS

An embodiment of an electronic device of the present invention is described with reference to the drawings. In this embodiment, an electronic device that can be operated by a remote control is a personal computer 1 having a video reproducing function. Another electronic device connected to the personal computer 1 is a television receiver 3. In this embodiment, the personal computer 1 and the television receiver 3 are connected via a high-definition multimedia interface (HDMI). However, the electronic device that can be operated by a remote control may be an electronic device other than the personal computer 1. The other electronic device connected to the personal computer 1 may be a home appliance other than the television receiver 3, such as a hard disk (HD) recorder or a stereo amplifier.

Figure 1:
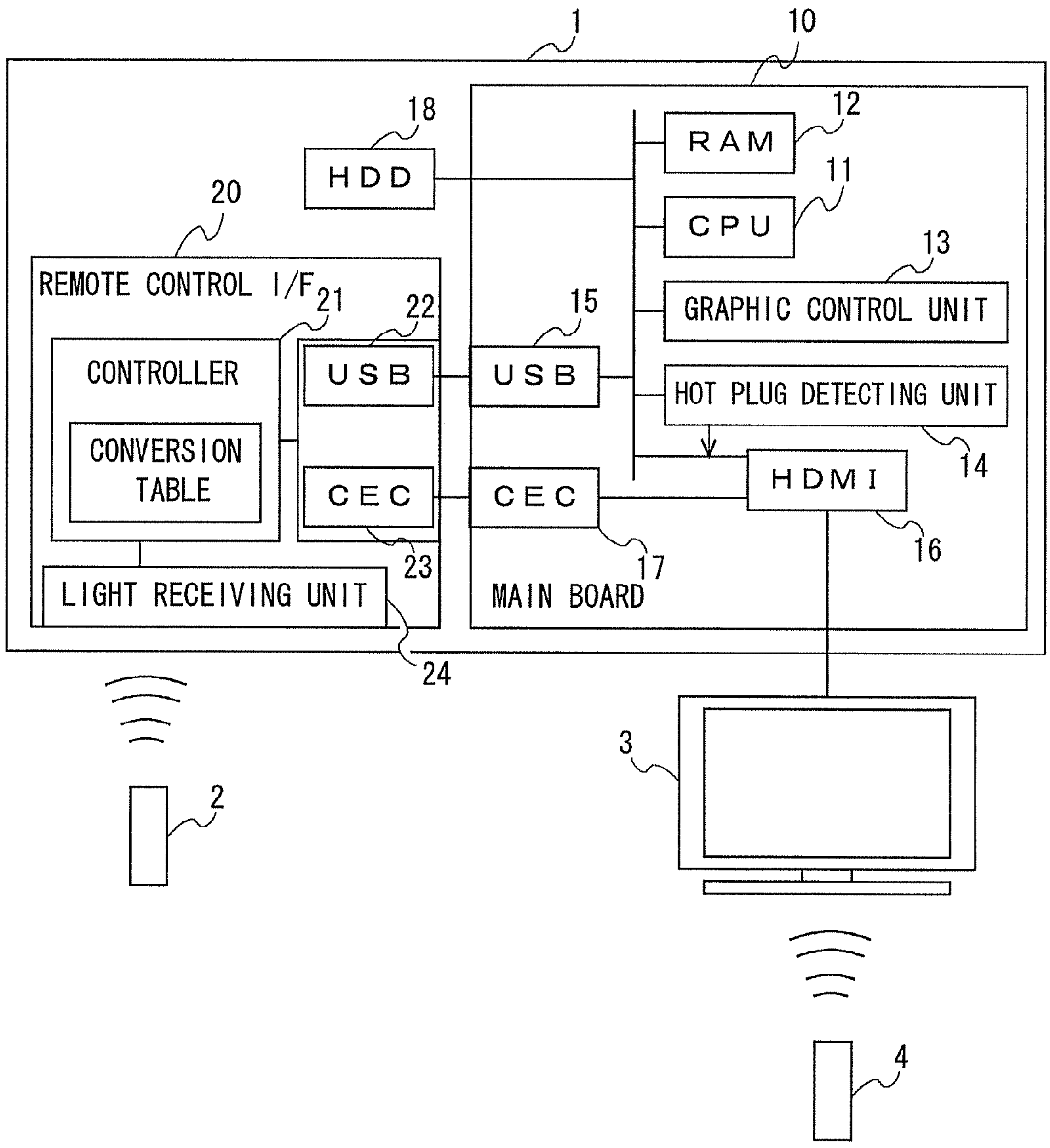
FIG. 1 is a diagram illustrating a configuration of a personal computer and a television receiver according to the embodiment.

FIG. 1 is a diagram illustrating a configuration of the personal computer 1 and the television receiver 3 according to this embodiment. The personal computer 1 is provided with main components and includes a main board 10 that outputs graphics and sound, and a remote control interface 20. In addition, the personal computer 1 includes various components that can be included in the personal computer 1, such as input and output devices including a keyboard, a mouse, and a display. However, illustration of these components is omitted.

The main board 10 includes a central processing unit (CPU) 11, a random access memory (RAM) 12, a graphic control unit 13, a hot plug detecting unit 14, a universal serial bus (USB) interface 15, an HDMI 16, and a CEC interface 17. The components are communicably connected with one another.

The HDMI 16 is an interface for connecting HDMI adapted devices such as the television receiver 3. The CEC interface 17 is an interface for a device control signal standardized by the HDMI and consumer electronics control (CEC) as a control protocol, and is used for transmitting and receiving control signals and the like between the CEC interface 17 and a controller 21 of the remote control interface 20 described later, to thereby implement mutual device control.

In this embodiment, the USB interface 15 is used for communication between the remote control interface 20 and the main board 10.

The graphic control unit 13 generates a video signal based on data read out from a storage device such as an HDD 18 or a DVD, and outputs the video signal to a display connected to the personal computer 1 or the HDMI-connected television receiver 3.

The hot plug detecting unit 14 detects that the television receiver 3 is connected to the HDMI 16. Specifically, the hog plug detecting unit 14 detects connection to the television receiver 3 according to a Hot Plug Detect signal in the HDMI standard, acquires a vendor ID during address allocation for controlling an HDMI device from the personal computer 1, and sets a manufacturer code in the controller 21.

The remote control interface 20 includes a light receiving unit 24, the controller 21, a USB interface 22, and a CEC interface 23. The light receiving unit 24 is an interface for receiving a signal transmitted from a remote control (compatible remote control) 2 attached to the personal computer 1, and transfers the received signal to the controller 21.

The controller 21 interprets the received signal and generates a control signal. The generated control signal is transferred to the main board 10 via the USB interfaces 15 and 22. The components of the personal computer 1, such as the graphic control unit 13, control the personal computer 1 based on the control signal. Further, in this embodiment, the controller 21 acquires a vendor ID from a digital home appliance such as the HDMI-connected television receiver 3, and sets a conversion table for converting an incompatible control signal into a compatible control signal according to a manufacturer code set from the CPU 11. Details of these kinds of processing are described later with reference to a sequence chart.

The television receiver 3 is connected to the personal computer 1 via the HDMI 16. CEC control can be performed from the personal computer 1 side. In this embodiment, the television receiver 3 receives a signal output from a remote control 4 attached to the television receiver 3, and transmits a control signal based on this signal to the personal computer 1 via the HDMI 16. The control signal transmitted to the personal computer 1 is an incompatible control signal for the personal computer 1. However, the conversion table is referred to by the controller 21, and thus the incompatible control signal is converted into a compatible control signal that can be interpreted in the personal computer 1.

Figure 2:
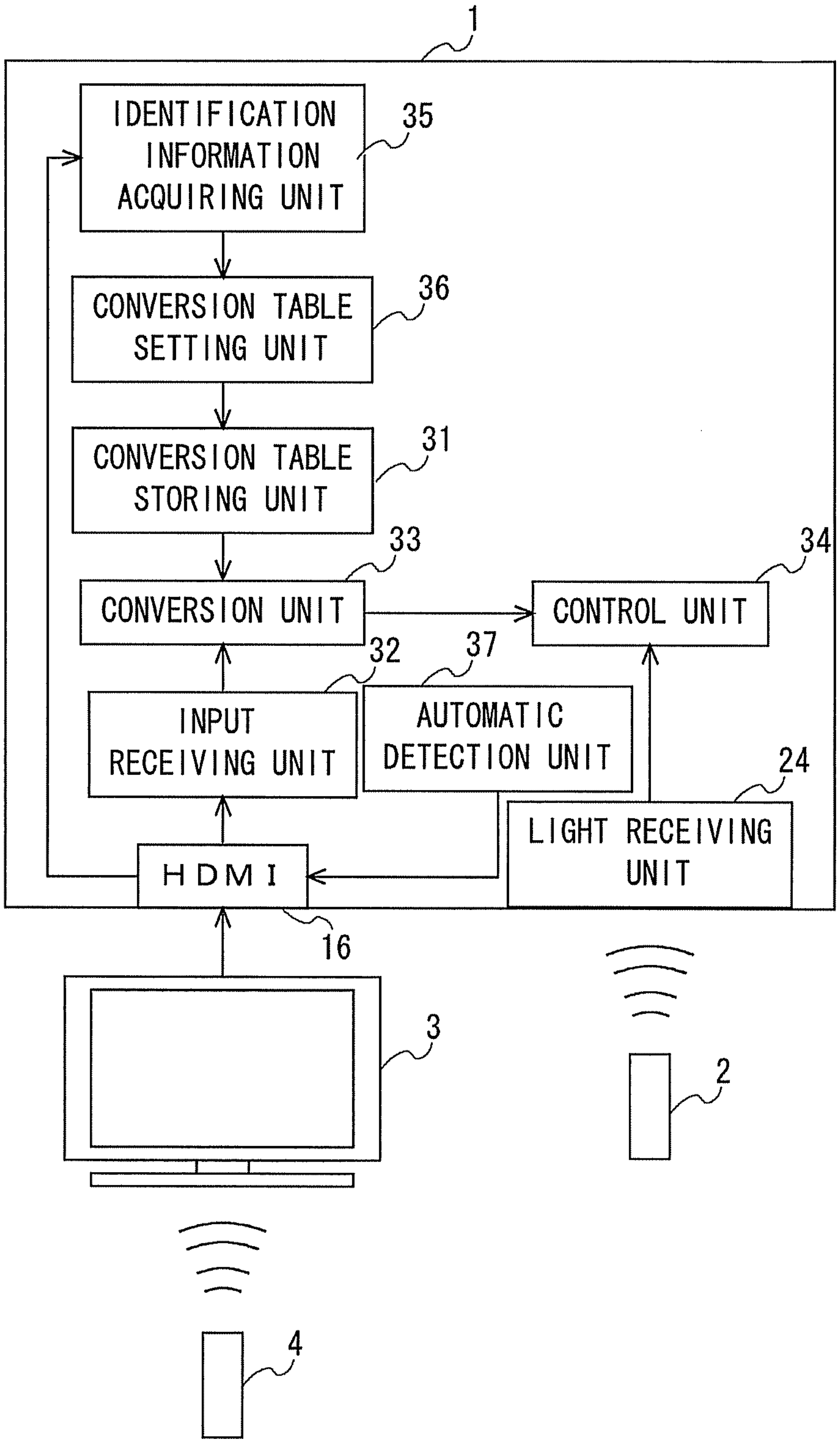
FIG. 2 is a diagram illustrating a functional configuration of the personal computer according to the embodiment.

FIG. 2 is a diagram illustrating a functional configuration of the personal computer 1 according to this embodiment. The CPU 11 executes a setting utility program, a remote control utility program, a video reproduction application, and the like installed in the personal computer 1 according to this embodiment, and thus the personal computer 1 operates as an electronic device including a conversion table storing unit 31, an input receiving unit 32, a conversion unit 33, a control unit 34, an identification information acquiring unit 35, a conversion table setting unit 36, and an automatic detection unit 37.

According to this embodiment, these functional units may be implemented by the CPU 11 that executes software corresponding to the functional units or may be implemented by dedicated processors independent from one another. Alternatively, one functional unit may be implemented by a plurality of processors or a plurality of functional units may be implemented by one processor.

In this embodiment, the conversion table storing unit 31 is implemented mainly by the controller 21. The conversion table storing unit 31 stores a plurality of kinds of conversion tables for converting an incompatible control signal that does not support the personal computer 1 into a compatible control signal that supports the personal computer 1.

In this embodiment, the input receiving unit 32 is implemented mainly by the CEC interfaces 17 and 23 and the USB interfaces 15 and 22. The input receiving unit 32 receives, via HDMI connection, a control signal based on an output of the incompatible remote control 4 transmitted from the television receiver 3.

In this embodiment, the conversion unit 33 is implemented mainly by the controller 21. The conversion unit 33 converts the incompatible control signal, which is input to and received by the input receiving unit 32, into a compatible control signal according to the conversion table.

In this embodiment, the control unit 34 is implemented mainly by the CPU 11 that executes various programs and the graphic control unit 13. The control unit controls the personal computer 1 according to the compatible control signal obtained through the conversion performed by the conversion unit 33, and outputs a generated video signal, to thereby allow the user to watch and listen to videos and audio.

In this embodiment, the automatic detection unit 37 is implemented mainly by the hot plug detecting unit 14. The automatic detection unit 37 automatically detects that the television receiver 3 is HDMI-connected to the personal computer 1. A method for automatic detection may be a method of using the Hot Plug Detect signal described in the description of the hot plug detecting unit 14. Alternatively, various methods such as a method of detecting an electric connection state and a method of detecting that a plug is physically inserted may be appropriately adopted according to embodiments.

In this embodiment, the identification information acquiring unit 35 is implemented mainly by the CPU 11 that executes the setting utility program and the controller 21. The identification information acquiring unit 35 acquires, from the television receiver 3 HDMI-connected to the personal computer 1, a vendor ID (in this embodiment, 3-byte information allocated to individual manufacturers) for identifying a manufacturer of the television receiver 3.

In this embodiment, the conversion table setting unit 36 is implemented mainly by the CPU 11 that executes the setting utility program and the controller 21. The conversion table setting unit 36 sets, based on the vendor ID acquired by the identification information acquiring unit 35, as a conversion table to be used by the conversion unit 33, a conversion table for converting a control signal of the HDMI-connected television receiver 3 into a compatible control signal among the conversion tables stored in the conversion table storing unit 31.

FIG. 3 is a diagram illustrating a structure of the conversion table in this embodiment. The conversion table is a table for storing, for each of manufacturers, a correspondence relation between a control content and a control signal. The correspondence relation between a control content and a control signal is different among the manufacturers. Even if a control content is the same, a control signal corresponding thereto may be different or even if a control signal is the same, a control content indicated by the control signal may be different.

FIG. 4 is a diagram illustrating contents of manufacturer codes in this embodiment. The computer according to this embodiment specifies a manufacturer of a home appliance such as the television receiver 3 connected to the personal computer 1 referring to a correspondence table of manufacturers and manufacturer codes prepared in the HDD 18 or the like in advance.

Figure 5:
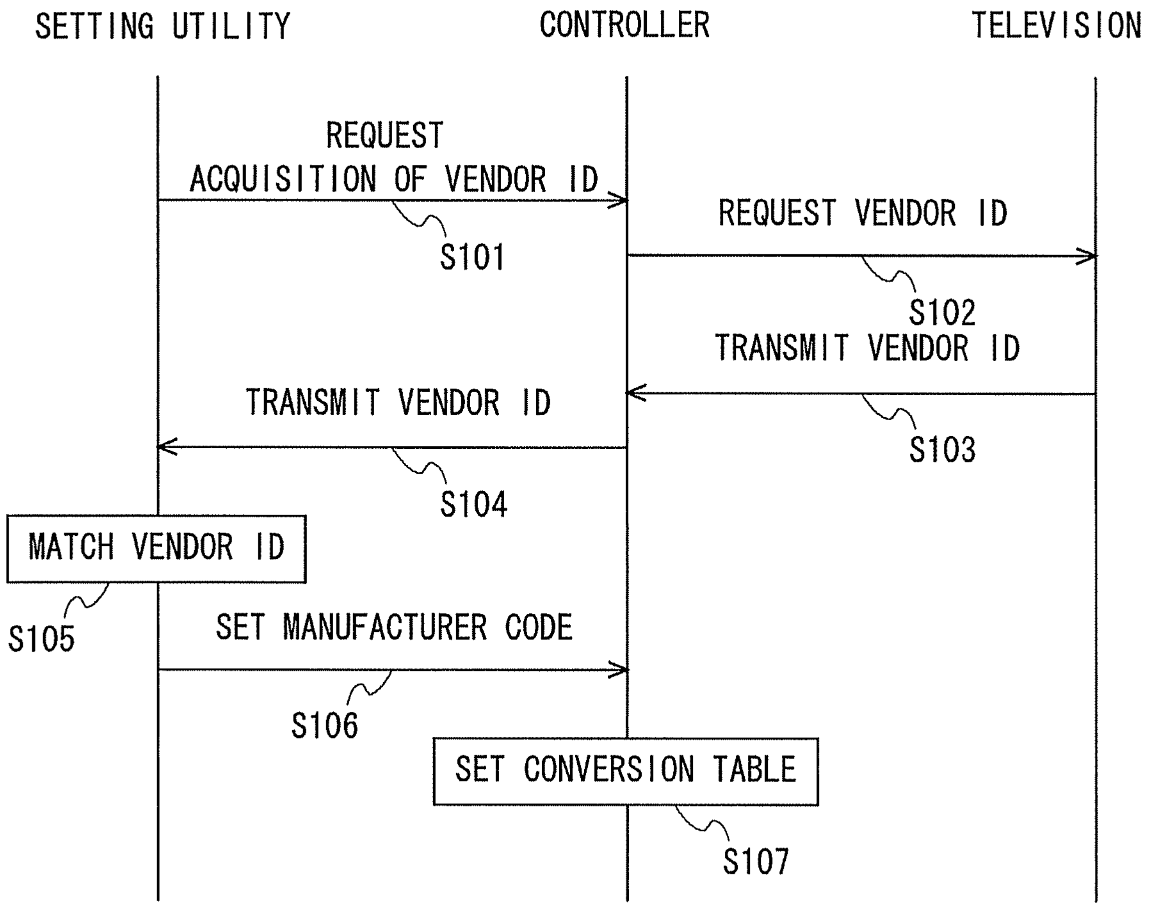
FIG. 5 is a sequence chart illustrating a flow of conversion table setting processing in the embodiment.

FIG. 5 is a sequence chart illustrating a flow of conversion table setting processing in this embodiment. The processing illustrated in the sequence chart is executed when connection of an HDMI adapted device (in this embodiment, television receiver 3) to the personal computer 1 is detected. Note that the processing illustrated in the sequence chart may be executed, in addition to a case in which connection of the HDMI adapted device is detected, in a case in which an event that is likely to cause necessity for setting a conversion table anew is detected, such as a case in which a system is restored or a case in which a change in resolution of an output video is detected.

In Steps S101 and S102, a request for acquisition of a vendor ID is performed. In response to detection of connection of an HDMI adapted device, the CPU (identification information acquiring unit 35), which executes the setting utility program, requests, via the USB interfaces 15 and 22, the controller 21 to acquire a vendor ID of the connected HDMI adapted device (Step S101). The controller 21, which receives the request for acquisition of the vendor ID, transmits a CEC signal for requesting the vendor ID to the television receiver 3 via the HDMI 16 (Step S102). After that, the processing proceeds to Step S103.

In Steps S103 and S104, the vendor ID is transmitted. In response to the vendor ID request in Step S102, the television receiver 3 reads out a vendor ID of the television receiver 3 itself and transmits the vendor ID to the controller 21 via the HDMI 16 (Step S103). The vendor ID transmitted from the television receiver 3 is further transmitted from the controller 21 to the CPU 11 (identification information acquiring unit 35), which executes the setting utility program, via the USB interfaces 15 and 22 (Step S104). The transmitted and received vendor ID is 3-byte information standardized and allocated to individual manufacturers. After that, the processing proceeds to Step S105.

In Step S105, matching of the vendor ID is performed. The CPU 11 (conversion table setting unit 36), which executes the setting utility program, specifies a manufacturer of the television receiver 3 connected to the personal computer 1 referring to a correspondence table (not illustrated) of manufacturers (vendor IDs) and manufacturer codes prepared in advance in the HDD 18 or the like. After that, the processing proceeds to Step 5106.

Note that in the processing of Step S105, it is also determined whether there is a manufacturer code corresponding to the specified vendor ID. As a result of the determination, when it is determined that there is no manufacturer code corresponding to the vendor ID, the CPU (conversion table setting unit 36), which executes the setting utility program, determines that the television receiver 3 of a manufacturer for which code conversion cannot be performed is connected, and ends the processing illustrated in the sequence chart.

In Step S106, a manufacturer code is set. The CPU 11 (conversion table setting unit 36), which executes the setting utility program, sets the manufacturer code specified in Step S105 in the controller 21 via the USB interfaces 15 and 22. In this case, the manufacturer code to be set is 1-byte information shorter than the vendor ID (see FIG. 4). The number of manufacturers that may be actually set is limited, and hence it is possible to save a needed storage area and a needed processing performance by reducing the manufacturer code to be set to 1 byte. After that, the processing proceeds to Step S107.

In Step S107, a conversion table is set. The controller 21 (conversion table setting unit 36), which receives the setting of the manufacturer code, specifies a conversion table corresponding to the set manufacturer code from among the conversion tables managed by the controller 21 itself, and sets the conversion table as a conversion table to be used in the following control signal conversion processing. After that, the processing illustrated in the sequence chart ends.

Figure 6:
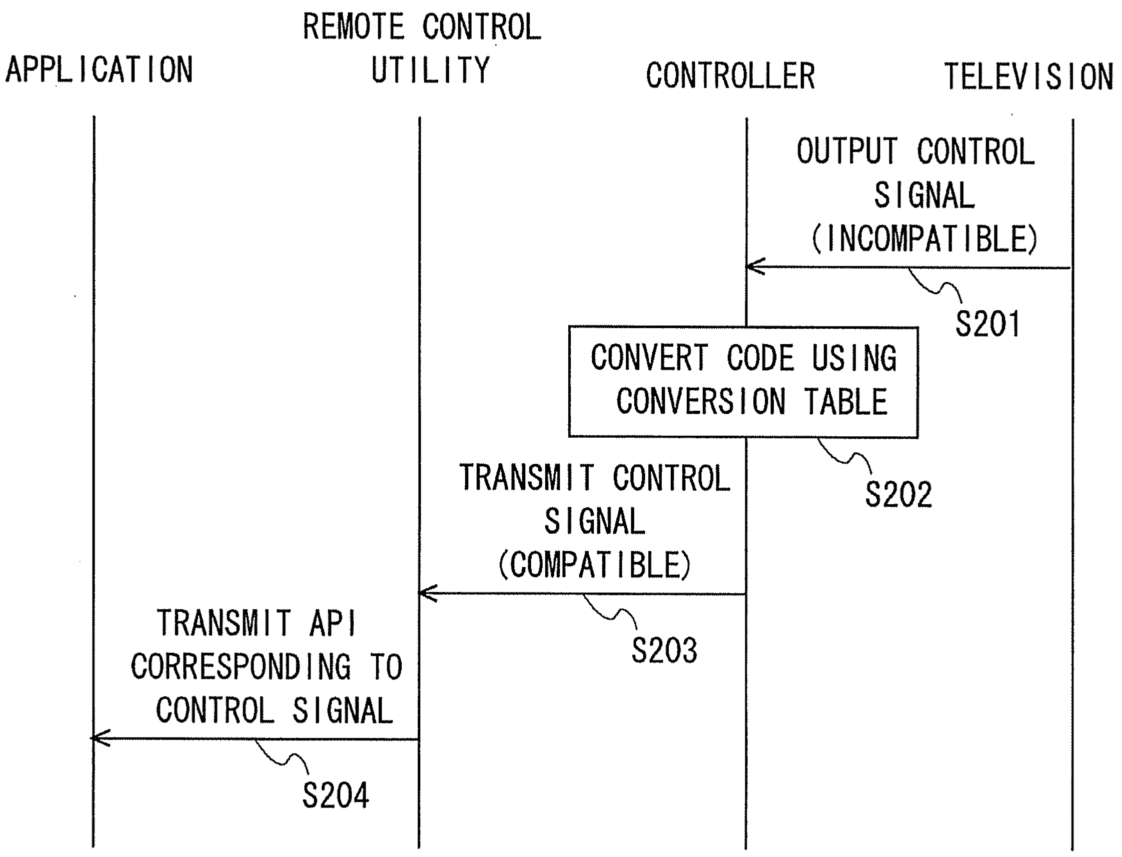
FIG. 6 is a sequence chart illustrating a flow of control signal conversion processing in the embodiment.

FIG. 6 is a sequence chart illustrating a flow of control signal conversion processing in this embodiment. The processing illustrated in the sequence chart is executed when operation by the remote control (incompatible remote control) 4 for the television receiver 3, which outputs a signal different from that of a remote control 2 attached to the personal computer 1, is received by a light receiving unit (not illustrated) of the television receiver 3.

In Step S201, an incompatible control signal is output from the television receiver 3. The television receiver 3 generates a control signal based on the operation by the incompatible remote control 4, and transmits this control signal to the controller 21 via the HDMI 16 and the CEC interfaces 17 and 23 (input receiving unit 32). After that, the processing proceeds to Step S202.

In Step S202, code conversion for the control signal is performed. The control signal transmitted in Step S201 is the incompatible control signal for the personal computer 1. Even if the control signal is directly transferred to the main board 10 of the personal computer 1, the personal computer 1 cannot interpret this control signal or performs operation that is not intended by the user who operates the remote control 4. Therefore, the controller 21 (conversion unit 33) performs code conversion referring to the conversion table set in Step S107.

For example, when an "enter" button is depressed by the user in the incompatible remote control 4 and a control signal indicating the "enter" button is 0x0E in the television receiver 3, the controller 21, which receives input of this control signal, converts this control signal into a control signal 0x01, which indicates that the "enter" button in the remote control (compatible remote control) 2 attached to the personal computer 1 is depressed, referring to a conversion table corresponding to a manufacturer (e.g., company A) of the television receiver 3. After that, the processing proceeds to Step S203.

In Steps S203 and S204, a compatible control signal is transmitted and control according to the control signal is performed. The controller 21 transmits the compatible control signal obtained through the conversion in Step S202 to the main board 10 via the USB interfaces 15 and 22 (Step S203). Specifically, on the main board 10 side, it is unnecessary to be aware whether the received control signal is a control signal generated by the operation of the compatible remote control 2 or a control signal generated by the operation of the incompatible remote control 4. The CPU 11, which executes the remote control utility program, notifies the video reproduction application of an API corresponding to the received control signal (e.g., API for performing control corresponding to "enter") (Step S204).

When the CPU 11, which executes the video reproduction application, controls the graphic control unit 13 or the like according to the notified API, the personal computer 1 executes operation corresponding to the operation performed by the user in the incompatible remote control 4. After that, the processing illustrated in the sequence chart ends.

In short, with the personal computer 1 according to this embodiment, it is possible to control a digital home appliance such as the personal computer 1 with the remote control 4 attached to the television receiver 3 familiar to the user. Therefore, convenience for the user is improved.

<Other Embodiments>

In the above described embodiment, when connection of the television receiver 3 is detected, the conversion table setting processing is started by the CPU that executes the setting utility program, and the conversion table is set in the controller 21. As another embodiment, the controller 21 may be configured so as to operate with a standby power supply, manage the table of vendor IDs, and perform the series of processing from the acquisition of a vendor ID to the setting of a conversion table without being instructed by the CPU. Consequently, even if the main board 10 of the personal computer 1 is on standby or in a power-off state, a conversion table may be automatically set when the television receiver 3 is connected. In other words, in this embodiment, the identification information receiving unit is implemented mainly by the controller 21 alone.

In this way, even if the personal computer 1 is on standby or in the power-off state, a conversion table is automatically set when the television receiver 3 is connected. This makes it possible to perform operation such as return from the standby of the personal computer 1 using an incompatible remote control, and cause the personal computer 1 to start video reproduction or the like using the incompatible remote control immediately after the start of the personal computer 1.

Figure 7:
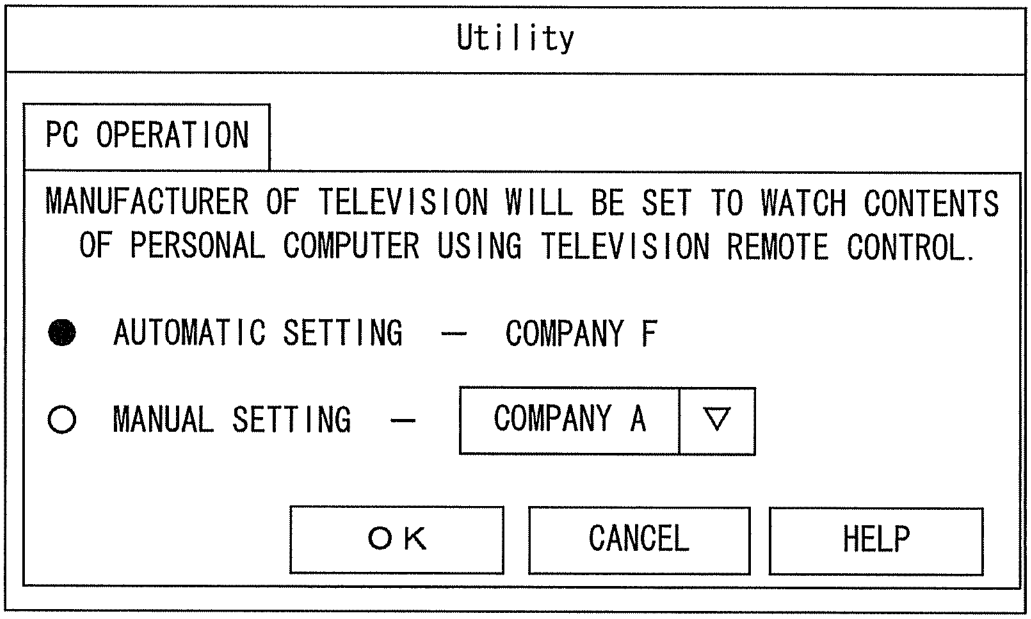
FIG. 7 is a diagram illustrating an image of a manual setting screen in the embodiment.

In addition to the automatic setting function described in the embodiment, a manual setting function by the user may be provided. As the manual setting function, for example, the CPU executes a manual setting utility program and outputs a manual setting screen as illustrated in FIG. 7, to thereby enable the user to select a manufacturer of the connected television receiver 3 or the like. The controller 21 sets a conversion table according to a content selected by the user and converts a control signal according to the set conversion table.

In this way, even when a control signal cannot be correctly converted in the automatic setting, for example, when a code system is changed from a conventional code system in a new model of the same manufacturer, it is possible to obtain correct conversion by causing the user to select a conversion table.

Conventionally, devices as targets of operation performed by using remote controls, such as home appliances, are adapted to only compatible remote controls attached to the devises or remote controls of the same manufacturers. Therefore, there is a problem in that only electronic devices of the same manufacturers can be operated by the attached remote controls and it is needed to use the remote control corresponding to each of the devices as the operation targets.

When it is attempted to solve this problem, as described above, the devices as the targets of remote control operation are conventionally adapted to only the compatible remote controls attached to the devices or the remote controls of the same manufacturers, and hence it is needed to adapt a remote control to an electronic device as an operation target on the remote control side to solve the problem. For example, in order to solve this problem, there are provided a remote control in which codes for adapting the remote control to a plurality of electronic devices are preset and a remote control that reads an infrared code output from another remote control and learns the code.

However, in this case, eventually, it is needed to introduce anew a remote control adapted to a plurality of electronic devices, and hence for a user, this is not a solution for a problem in that the user needs to stop the use of a familiar remote control and become familiar with operation of the new remote control. Further, the remote control adapted to the plurality of electronic devices requires setting by manual operation. Therefore, in starting to use the remote control, the user needs to perform complicated setting work.

In view of the problems, it is an object of the present invention to enable an electronic device to be operated by using a remote control other than a remote control attached to the electronic device without performing complicated setting work.

In order to solve the problems, an electronic device of the present invention converts an incompatible control signal based on an output of an incompatible remote control into a compatible control signal on the electronic device side, which receives the incompatible control signal, to thereby perform operation of the electronic device using a remote control other than a remote control attached to the electronic device without performing complicated setting work.

Specifically, according to the present invention, an electronic device that can be operated by a remote control includes: conversion table storing unit to store a conversion table for converting an incompatible control signal that does not support the electronic device into a compatible control signal that supports the electronic device; input receiving unit to receive an input of the incompatible control signal based on an output of an incompatible remote control that does not output the compatible control signal; conversion unit to convert the incompatible control signal, which is input to and received by the input receiving unit, into the compatible control signal according to the conversion table; and control unit to control the electronic device according to the compatible control signal obtained through the conversion performed by the conversion unit.

Remote control operation is operation performed by using a remote control that is a device for remotely operating the electronic device. A method of transmitting a signal for operating the electronic device from the remote control is not limited to an infrared ray generally in wide use. Other wireless communication unit may be used or wired communication unit may be used. The present invention makes it possible to, in such an electronic device that can be operated by the remote control, operate the electronic device with an incompatible remote control other than a compatible remote control adapted to the electronic device in the original state. The compatible remote control is, for example, a remote control attached to this electronic device. If an output is made from the compatible remote control, the electronic device can interpret a control content indicated by a signal and operate in the original state.

The electronic device of the present invention converts the incompatible control signal based on the output from the incompatible remote control on the electronic device side, which receives the incompatible control signal, to thereby operate the electronic device using the incompatible remote control. Consequently, unlike the conventional method of adapting a remote control to an electronic device as an operation target on the remote control side, it is possible to operate the electronic device using a remote control other than a remote control attached to the electronic device without performing complicated setting work.

Further, the conversion table storing unit may store a plurality of kinds of the conversion tables; and the electronic device may further include: identification information acquiring unit to acquire, from another electronic device having communicable connection to the electronic device and adapted to the incompatible remote control, identification information for identifying a type of a control signal of the another electronic device; and conversion table setting unit to set, based on the identification information acquired by the identification information acquiring unit, as a conversion table to be used by the conversion unit, a conversion table for converting the control signal of the connected another electronic device into the compatible control signal among the plurality of kinds of the conversion tables stored in the conversion table storing unit.

The identification information is acquired from the electronic device adapted to the incompatible remote control and the conversion table is set according to this identification information. Therefore, it is possible to specify and set, from among the plurality of conversion tables prepared in advance, a conversion table that can correctly convert an input incompatible control signal into a compatible control signal. The conversion table is set according to the identification information, and hence a user can use the incompatible remote control without necessity for performing work such as selection of a conversion table. The identification information is, for example, manufacturer information of the another electronic device or the like.

Further, the input receiving unit may receive, through the connection, a control signal based on the output of the incompatible remote control from the another electronic device that receives the output of the incompatible remote control.

Specifically, the electronic device of the present invention receives the control signal based on the output of the incompatible remote control via connection used in acquiring the identification information. Consequently, the user can perform operation for the another electronic device using the incompatible remote control, to thereby operate the electronic device of the present invention. For example, when the electronic device of the present invention is a personal computer that can reproduce videos and the another electronic device connected thereto is a television receiver, the user can operate the personal computer with feeling of operating the television receiver and watch and listen to videos and audio output by the personal computer.

Further, the electronic device of the present invention may further include automatic detection unit to automatically detect that the another electronic device is connected, and the identification information acquiring unit and the conversion table setting unit may acquire the identification information and set the conversion table when the automatic detection unit automatically detects that the another electronic device is connected.

The electronic device of the present invention includes the automatic detection unit and the setting of the conversion table is performed according to automatic detection. Therefore, the user can operate the electronic device of the present invention using the remote control of the another electronic device by simply connecting the another electronic device to the electronic device of the present invention.

Further, the identification information acquiring unit may operate independently, even when a main section of the electronic device is in a power saving mode or is not started, to thereby acquire the identification information from the connected another electronic device.

Acquiring the identification information even when the electronic device is in the power saving mode or is not started enables the user to immediately perform operation using the incompatible remote control when the electronic device returns from the power saving mode or is started.

Further, the processing performed by the device of the present invention can also be provided as a method to be executed by a computer or a program for causing the computer to execute the processing. Such a program can be provided while being recorded on a recording medium readable by the computer and other apparatuses, machines, and the like. The recording medium readable by the computer and the like refers to a recording medium on which information such as data and programs are accumulated by an electric, magnetic, optical, mechanical, or chemical action and can be read from the computer and the like.

With the electronic device of the present invention, it is possible to perform operation of the electronic device using a remote control other than a remote control attached to the electronic device without performing complicated setting work.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such example in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. An electronic device operable by a remote control, comprising:

a conversion table storing unit to store a plurality of kinds of conversion tables for converting an incompatible control signal without supporting the electronic device into a compatible control signal supporting the electronic device;

an input receiving unit to receive an input of the incompatible control signal based on an output of an incompatible remote control without outputting the compatible control signal;

an identification information acquiring unit to acquire, from another electronic device having communicable connection to the electronic device and adapted to the incompatible remote control, identification information for identifying a type of a control signal of the another electronic device;

a conversion table setting unit to set, based on the identification information acquired by the identification information acquiring unit, as a current conversion table, a conversion table for converting the control signal of the connected another electronic device into the compatible control signal among the plurality of kinds of the conversion tables stored in the conversion table storing unit;

a conversion unit to convert the incompatible control signal, which is input to and received by the input receiving unit, into the compatible control signal according to the current conversion table; and a control unit to control the electronic device according to the compatible control signal obtained through the conversion performed by the conversion unit.

2. An electronic device according to claim 1, wherein the input receiving unit receives, through the connection, a control signal based on the output of the incompatible remote control from the another electronic device that receives the output of the incompatible remote control.

3. An electronic device according to claim 1, wherein:

the identification information comprises manufacturer information of the another electronic device; and the conversion table setting unit sets, based on the manufacturer information, the current conversion table.

4. An electronic device according to claim 1, further comprising automatic detection unit to automatically detect that the another electronic device is connected, wherein the identification information acquiring unit and the conversion table setting unit acquire the identification information and set the current conversion table when the automatic detection unit automatically detects that the another electronic device is connected.

5. An electronic device according to claim 1, wherein the identification information acquiring unit operates independently, even when a main section of the electronic device is in a power saving mode or is not started, to thereby acquire the identification information from the connected another electronic device.

6. An electronic device according to claim 1, wherein the compatible control signal comprises a signal based on an output of a compatible remote control attached to the electronic device.

7. A control signal conversion method to be executed by an electronic device operable by a remote control, and comprises a conversion table storing unit to store plurality of kinds of conversion tables for converting an incompatible control signal without supporting the electronic device into a compatible control signal supporting the electronic device, the control signal conversion method comprising:

receiving an input of the incompatible control signal based on an output of an incompatible remote control without outputting the compatible control signal;

acquiring, from another electronic device having communicable connection to the electronic device and adapted to the incompatible remote control, identification information for identifying a type of a control signal of the another electronic device;

setting, based on the identification information acquired in the acquiring, as a current conversion table, a conversion table for converting the control signal of the connected another electronic device into the compatible control signal among the plurality of kinds of the conversion tables stored in the conversion table storing unit;

converting the incompatible control signal, which is input and received in the receiving, into the compatible control signal according to the conversion table; and controlling the electronic device according to the compatible control signal obtained through the conversion performed in the converting.

8. A non-transitory readable-by-computer recording medium recorded with a control signal conversion program for causing an electronic device operable by a remote control to function as:

storing a plurality of kinds of conversion tables for converting an incompatible control signal without supporting the electronic device into a compatible control signal supporting the electronic device;

receiving an input of the incompatible control signal based on an output of an incompatible remote control outputting the compatible control signal;

acquiring, from another electronic device having communicable connection to the electronic device and adapted to the incompatible remote control, identification information for identifying a type of a control signal of the another electronic device;

setting, based on the identification information acquired in the acquiring, as a current conversion table, a conversion table for converting the control signal of the connected another electronic device into the compatible control signal among the plurality of kinds of the conversion tables stored in the storing;

converting the incompatible control signal, which is input to and received by the receiving, into the compatible control signal according to the current conversion table; and controlling the electronic device according to the compatible control signal obtained through the conversion performed by the converting.

* * * * *